# United States Patent Office 3,256,302
Patented June 14, 1966

3,256,302
2-HYDROXYMETHYLENE-17α-ETHINYL-17β-HY-DROXY-19-NOR-4-ANDROSTEN-3-ONE
George W. Moersch, Ann Arbor, Mich., assignor to Parke, Davis & Company, Detroit, Mich., a corporation of Michigan
No Drawing. Filed Oct. 20, 1960, Ser. No. 63,730
1 Claim. (Cl. 260—397.4)

This invention relates to compounds of the norandrostane series. More particularly, it relates to 2-hydroxymethylene - 17α - ethinyl - 17β - hydroxy - 19 - nor - 4-androsten-3-one of the formula

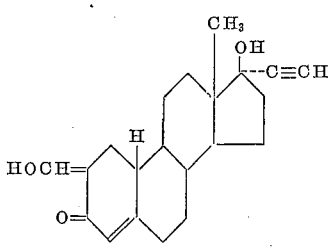

and to methods for its production.

In accordance with the invention 2-hydroxymethylene-17α-ethinyl-17β-hydroxy-19-nor-4-androsten-3-one can be produced by reacting 17α-ethinyl-17β-hydroxy-19-nor-4-androsten-3-one with a lower alkyl formate in the presence of an alkali metal base, followed by acidifying the reaction product. The alkali metal base can be the metal itself or a basic derivative of the metal, such as the hydride, amide or alkoxide. Sodium hydride is the preferred agent. The reaction can be carried out with a lower alkyl formate such as ethyl formate, by stirring the reagents in an unreactive solvent such as tetrahydrofuran, diethyl ether, dipropyl ether, benzene, or mixtures thereof. The reaction proceeds readily at room temperature and is substantially complete within a period of from 24 to 48 hours. The reaction can also be carried out at other temperatures between 0° and 100° C., or the boiling point of the selected solvent, by varying the reaction time. The reagents can be used in equimolar quantities, although it is preferable to use an excess of sodium hydride and the alkyl formate in order to obtain the best conversion of the steroidal starting material. The reaction mixture contains the product in the form of an alkali metal salt, and the 2-hydroxymethylene-17α-ethinyl-17β-hydroxy-19-nor-4-androsten-3-one is obtained by acidification, preferably after dilution of the mixture with water and removal of the organic solvent.

The product of this invention has useful pharmacological properties. It has hypocholesteremic activity and upon oral or parenteral administration produces a marked fall in the level of blood cholesterol with relative freedom from side effects, such as estrogenic activity, which limit the usefulness of other hypocholesteremic agents.

The invention is illustrated but not limited by the following example:

Example

A solution of 5 g. of 17α-ethinyl-17β-hydroxy-19-nor-4-androsten-3-one in 150 ml. of dry tetrahydrofuran is treated with 2.9 g. of sodium hydride (5.8 g. of a 50% dispersion of sodium hydride in mineral oil) and 5.5 g. of ethyl formate, and the mixture is stirred for 24 hours, preferably in a nitrogen atmosphere. An additional 4.6 g. of ethyl formate is added and the stirring continued for 24 more hours. The mixture is treated dropwise with 100 ml. of water and the tetrahydrofuran removed by distillation under reduced pressure. The remaining mixture is stirred with 1 liter of water and the insoluble material removed by filtration. The filtrate, which contains the desired product in the form of the sodium salt, is cooled and acidified with dilute hydrochloric acid to precipitate 2-hydroxymethylene-17α-ethinyl-17β-hydroxy-19-nor-4-androsten-3-one; a yellow-orange solid, M.P. about 180° C. with prior softening after crystallization from ether.

Alternatively, the product can also be obtained in the following manner. The dark yellow sodium salt formed in the reaction is filtered from the tetrahydrofuran and dried. The sodium salt is then dissolved in water and the solution filtered and acidified with dilute hydrochloric acid to precipitate 2-hydroxymethylene-17α-ethinyl-17β-hydroxy-19-nor-4-androsten-3-one.

I claim:
2 - hydroxymethylene - 17α - ethinyl - 17β - hydroxy-19-nor-4-androsten-3-one.

References Cited by the Examiner
UNITED STATES PATENTS

| | | |
|---|---|---|
| 2,908,693 | 10/1959 | Ringold et al. _____ 260—397.4 |
| 3,118,915 | 1/1964 | Ringold et al. _____ 260—397.4 |
| 3,135,743 | 6/1964 | Clinton et al. ____ 260—239.55 |

OTHER REFERENCES

Fieser et al.: Steroids, p. 592 (1959), Reinhold Pub. Co., New York.

LEWIS GOTTS, Primary Examiner.

LESLIE H. GASTON, Examiner.

G. E. LANDE, HENRY A. FRENCH,
Assistant Examiners.